US006816616B2

(12) United States Patent
Teng

(10) Patent No.: US 6,816,616 B2
(45) Date of Patent: Nov. 9, 2004

(54) HEADER COMPRESSION FOR IMAGE DATA STREAM

(75) Inventor: Chia-Yuan Teng, San Diego, CA (US)

(73) Assignee: WebEx Communications, Inc., San Jose, CA (US)

( * ) Notice: Subject to any disclaimer, the term of this patent is extended or adjusted under 35 U.S.C. 154(b) by 699 days.

(21) Appl. No.: 09/872,402

(22) Filed: May 31, 2001

(65) Prior Publication Data

US 2003/0081838 A1 May 1, 2003

(51) Int. Cl.$^7$ .................................................. G06K 9/36
(52) U.S. Cl. .......................... 382/232; 382/248; 702/76
(58) Field of Search .............................. 370/392, 477; 375/241; 382/232, 248, 128; 702/76

(56) References Cited

U.S. PATENT DOCUMENTS 5,579,316 A * 11/1996 Venters et al. .............. 370/392
5,604,824 A * 2/1997 Chui et al. .................. 382/248
6,633,674 B1 * 10/2003 Gemperline et al. ........ 382/232

FOREIGN PATENT DOCUMENTS

JP           02002218459 A  *  8/2002  ............ H04N/7/24

* cited by examiner

Primary Examiner—Anh Hong Do
(74) Attorney, Agent, or Firm—Blakely, Sokoloff, Taylor & Zafman LLP

(57) ABSTRACT

Headers of image frames are compressed. Header of a first frame is received, where the header includes a plurality of header parameters. Further, differences are determined between the header parameters and a plurality of default parameters, and non-default parameters are sent when there are differences. The header is then compressed to include only a first type of marker, and is sent through the transmission channel. In one embodiment, the non-default parameters are sent through a control channel, while the compressed header is sent through a data channel.

22 Claims, 4 Drawing Sheets

HEADER COMPRESSION FOR IMAGE DATA STREAM

BACKGROUND

The present invention relates to header data, and more particularly, to compressing the size of header data in image data stream.

Digital data, whether transmitted over a wire-based distribution network (e.g., local area network, wide area network, or cable) or a wireless distribution network (e.g., satellite, RF, or optical), is typically packetized and sent over the network in individual packets. Some protocols call for fixed size packets, while other protocols utilize variable size packets. The packet may include header, compressed data, and trailer. To improve transmission efficiency and to keep pace with the demand for digital information, it is desirable to be able to pack increasingly more data through the same bandwidth pipeline over the network.

One way to achieve this objective includes packet compression. Packets may be compressed at a source node, transmitted in their compressed state over the network, and decompressed at a destination node. Another solution may include compressing not only the data but other portions of the packet, such as a header or a data payload, as well.

In JPEG200 data stream, for example, the header starts with a two-byte start-of-codestream (SOC) marker, 0xFF4F. The header carries information about image and tiles, including image size (width and height), tile size, number of components, component transforms used, wavelet transform used, component precision, subsampling factors, number of decomposition levels, number of layers, code-block size, quantization, coding styles (e.g. selective arithmetic coding bypass, and vertically stripe causal context) and other related parameters. The compressed data, beginning with a two-byte start-of-data (SOD) marker, 0xFF93 (hex), includes output after arithmetic coder. The trailer includes a two-byte end-of-codestream (EOC) marker, 0xFFD9 (hex).

The size of header and trailer for a one-tile color image may be 120 bytes or more. Thus, the overhead from the header and trailer may be proportionally large for small-sized images that have been compressed. For example, the overhead is 15.6% for an SQCIF (128×96) image compressed at 0.5 bits/pixel.

SUMMARY

In one aspect, compressing headers of image frames is disclosed. Header of a first frame is received, where the header includes a plurality of header parameters. Further, differences are determined between the header parameters and a plurality of default parameters, and non-default parameters are sent when there are differences. The header is then compressed to include only a first type of marker, and is sent through the transmission channel. In one embodiment, the non-default parameters are sent through a control channel, while the compressed header is sent through a data channel.

In another aspect, a header of a current frame subsequent to the first frame is received, where the header includes a plurality of header parameters. Further, differences are determined between the plurality of header parameters and a previous plurality of header parameters. The headers are then compressed to include only a first type of marker when there are no differences. The headers are compressed to include a second type of marker, and a group of parameters that are different, when there are differences. The header is then sent through the transmission channel.

DETAILED DESCRIPTION

Figure 1A:
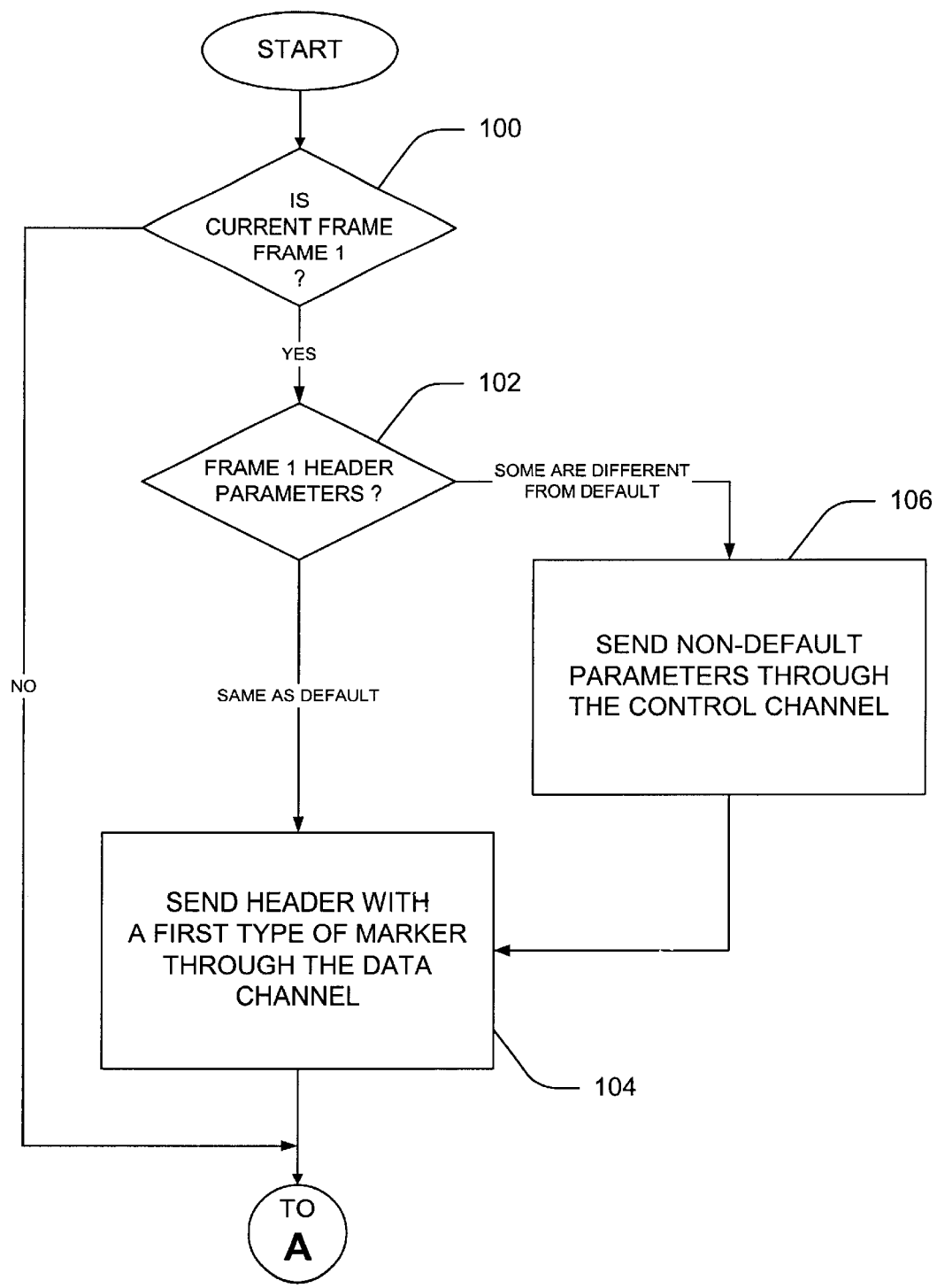
FIGS. 1A, 1B and 1C are a flowchart of the header compression method in accordance with an embodiment of the present invention.

In recognition of the above-stated objectives for an improved header compression scheme, the present invention describes embodiments for header compression in image data stream, including image frames. In one embodiment, frame 1 header parameters may be compressed by comparing the header parameters with default parameters. The header may be compressed to include only a first type of marker. The compressed header may then be transmitted through the data channel. If frame 1 header parameters include some parameters that are different from the default parameters, then the non-default parameters may be sent through the control channel.

In another embodiment, frames 2 through n are compared to the previous frame, where n represents the total number of frames. If the parameters in frames 2 through n are same as those of the previous frame, then the header may be compressed to include only a first type of marker. Otherwise if any of the parameters in frames 2 through n are different from those of the previous frame, then the header may include a marker plus information about those different parameters.

In JPEG2000, for example, the header includes a variety of parameters, some of which have been mentioned above. Many of these parameters may remain unchanged, and may already be known by both source and destination nodes. Thus, transmission of these parameters through the communication channel may not be necessary. Moreover, for image sequences, many of the parameters of the frames subsequent to the first frame are often same as those of the first or other previous frames. Therefore, only the parameters of the first or other previous frames may need to be transmitted. Here, the term 'previous frames' may refer to an immediately prior frame, any prior frame, or any combination of prior frames. For example, if the current frame is frame 5, the immediately prior frame is frame 4. Frames 1 through 4 are any prior frames. Further, the image sequences are often carried over a communication channel using User Datagram Protocol (UDP). This protocol is widely used for applications in which prompt delivery more important than accurate delivery, such as transmitting speech or video.

Accordingly, in one embodiment, the headers may be compressed as described below. The description of the compression scheme is separated into 9 different exemplary cases according to the frame header parameters. Further, following assumptions are made in the description below: source and destination nodes keep same list of default parameters; and an out-band channel exists to exchange control messages using a control protocol. An example of such a control protocol is Real-time Streaming Protocol (RTSP), which is widely used in multimedia streaming. The RTSP is usually carried over Transmission Control Protocol (TCP) for reliable transmission. Therefore, the transmission of image parameters over control channel rather than data channel may provide higher reliability. Consequently for purposes of illustration and not for purposes of limitation, the exemplary embodiments of the invention are described in a manner consistent with such use, though clearly the invention is not so limited.

In one embodiment, the headers are compressed as follows.

Case 1

Frame 1 header parameters include only default parameters. In this case, no image parameters are transmitted. Thus, the out-band control channel carries no image parameters. The header is compressed to a one-byte marker 0x00. One-byte marker of 0x00 distinguishes this compressed header from the standard header.

Case 2

Some frame 1 header parameters are different from the default parameters. In this case, the non-default parameters are transmitted through the out-band control channel. The header is compressed to a one-byte marker 0x00.

For example, assume that width and height are the only non-default parameter. These parameters may be carried by DESCRIBE response of RTSP, as follows:

```
(client -> server)
DESCRIBE rtsp://presenter.com/stream1.jp2s RTSP/1.0
Cseq: 3
Accept: application/sdp, application/rtsl, application/mheg
(server -> client)
RTSP/1.0 200 OK
Cseq: 3
Date: 23 Feb 2001 15:00:00 GMT
Content-Type: application/sdp
Content-Length: 376
v = 0
...
m = image49170 RTP/AV 97
a = rtpmap:97 JP2K/90000
a = size: 128 x 96       <= NON-DEFAULT PARAMETERS
...
```

One of the advantages of transmitting parameters over RTSP/TCP, in addition to compression efficiency, includes reliability, because TCP guarantees a reliable end-to-end transmission.

Case 3

Header parameters of frames 2 through n are same as those of the previous frame, where n indicates the total number of frames in the image stream. In this case, no image parameters are transmitted over the control channel. The header is compressed to a one-byte marker 0x00.

Case 4

Header parameters, width or height, of frames 2 through n is different from those of the previous frame. In this case, the first (least significant) bit of the marker is set to 1, and the parameters, width and/or height, are included in the header after marker. An example of the header syntax is shown in Table 1. Note that the standard header is presented in the codestream if either image width or height is greater than 65535.

TABLE 1

Example Header Syntax for Case 4

| Parameters | Size (# bits) | Value |
|---|---|---|
| marker | 8 | xxxxxxx1 |
| image width | 16 | 0–65535 |
| image height | 16 | 0–65535 |

Case 5

Header parameters, implicit quantization, subsampling factors or number of layers, of frames 2 through n is different from those of the previous frame. In this case, the second bit of the marker is set to 1, and the implicit quantization, subsampling, and/or number of layers are added to the header. An example of the header syntax is shown in Table 2. Note that the image width and/or height may not be present in the header. Moreover, the presence or absence of the image width and/or height may be indicated by the first bit of the marker, as described in Case 4. Further, note that the standard header may be present in the codestream if the subsampling method other than 4:4:4 or 4:2:0 is exploited, or the number of the layers is more than 63.

TABLE 2

Example Header Syntax for Case 5

| Parameters | Size (# bits) | Value |
|---|---|---|
| marker | 8 | xxxxxx1x |
| image width | 0 or 16 | 0–65535 |
| image height | 0 or 16 | 0–65535 |
| implicit quantization | 1 | 0 = implicit quantization<br>1 = explicit quantization |
| subsampling | 1 | 0 = 4:4:4 subsampling.<br>1 = 4:2:0 subsampling |
| number of layers | 6 | 0–63 |

Case 6

Header parameters, color precision, color transform used, wavelet transform used, or number of decomposition levels, of frames 2 through n is different from those of the previous frame. In this case, the third bit of the marker is set to 1. Moreover, the color precision, transform used, and number of decomposition levels are added to the header. An example of the header syntax is shown in Table 3. Note that the image width, height, implicit quantization, subsampling, and/or number of layers may not be present in the header. The presence or absence of these parameters is indicated by the first two bits of the marker, as described in Cases 4 and 5. Further, note that the standard header may be present in the codestream if the color precision is not one of those listed in Table 3, or the number of the decomposition levels is more than 15.

TABLE 3

Example Header Syntax for Case 6

| Parameters | Size (# bits) | Value |
|---|---|---|
| Marker | 8 | xxxxx1xx |
| image width | 0 or 16 | 0–65535 |
| image height | 0 or 16 | 0–65535 |
| implicit quantization | 0 or 1 | 0 = implicit quantization<br>1 = explicit quantization |
| subsampling | 0 or 1 | 0 = 4:4:4 subsampling.<br>1 = 4:2:0 subsampling |
| number of layers | 0 or 6 | 0–63 |
| color precision | 2 | 0 = 24 bits color<br>1 = 16 bits color<br>2 = 8 bits color<br>3 = 8 bits gray scale |
| transform used | 2 | 0 = ICT color transform and 9-7 floating point wavelet transform<br>1 = RCT color transform and 5-3 integer wavelet transform |
| number of decomposition levels | 4 | 0–15 |

Case 7

Header parameters, selective arithmetic coding bypass, vertical stripe causal context, code-block width, or code-block height, of frames 2 through n is different from those of the previous frame. In this case, the fourth bit of the marker is set to 1, and the selective arithmetic coding bypass, vertical stripe causal context, code-block width, and/or code-block height are added to the header. An example of the header syntax is shown in Table 4. Note that the image width, height, implicit quantization, subsampling, number of layers, color precision, transform used, and/or number of decomposition levels may not be present in the header. Moreover, the presence or absence of these parameters may be indicated by the first three bits of the marker, as described in Cases 4, 5 and 6.

TABLE 4

Example Header Syntax for Case 7

| Parameters | Size (# bits) | Value |
|---|---|---|
| Marker | 8 | xxxx1xxx |
| image width | 0 or 16 | 0–65535 |
| image height | 0 or 16 | 0–65535 |
| implicit quantization | 0 or 1 | –0 = implicit quantization<br>1 = explicit quantization |
| subsampling | 0 or 1 | 0 = 4:4:4 subsampling.<br>1 = 4:2:0 subsampling |
| number of layers | 0 or 6 | –0–63 |
| color precision | 0 or 2 | 0 = 24 bits color<br>1 = 16 bits color<br>2 = 8 bits color<br>3 = 8 bits gray scale |
| transform used | 0 or 2 | 0 = ICT color transform and 9-7 floating point wavelet transform<br>1 = RCT color transform and 5-3 integer wavelet transform |
| number of decomposition levels | 0 or 4 | 0–15 |
| selective arithmetic coding bypass | 1 | 0 = no selective arithmetic coding bypass<br>1 = selective arithmetic coding bypass |
| vertical stripe causal context | 1 | 0 = no vertical stripe causal context<br>1 = vertical stripe causal context |

TABLE 4-continued

Example Header Syntax for Case 7

| Parameters | Size (# bits) | Value |
|---|---|---|
| Code-block width | 3 | 0 = 4; 1 = 8; 2 = 16; 3 = 32; 4 = 64; 5–7: reserved |
| Code-block height | 3 | 0 = 4; 1 = 8; 2 = 16; 3 = 32; 4 = 64; 5–7: reserved |

Case 8

Header parameter, quantization values (e.g. step sizes), of frames 2 through n is different from those of the previous frame. In this case, the fifth bit of the marker is set to 1, and the quantization values are added to the header. The number of the quantization values presented in the header varies with the number of the components, number of the decomposition levels, and/or the implicit/explicit quantization mode.

For example, if n is the number of quantization values, c is the number of components, and L is the number of decomposition levels, then the relationship between the parameters may be expressed as $n=c*(3*L+1)$ for the explicit quantization mode. Moreover, for the implicit quantization mode, the relationship may be expressed as $n=c$. The size (number of bits) of each quantization value in the header may be determined by the wavelet transform used. Thus, the size of quantization value may equal 8 bits on integer 5-3 wavelet transform, and 16 bits on floating-point 9-7 wavelet transform. An example of the header syntax is shown in Table 5. Note that the image width, height, implicit quantization, subsampling, number of layers, color precision, transform used, number of decomposition levels, selective arithmetic coding bypass, vertical stripe causal context, code-block width, and/or code-block height may not be present in the header. Further, the presence or absence of these parameters may be indicated by the first four bits of the marker, as described in Cases 4, 5, 6 and 7.

TABLE 5

Example Header Syntax for Case 8

| Parameters | Size (# bits) | Value |
|---|---|---|
| Marker | 8 | xxx1xxxx |
| image width | 0 or 16 | 0–65535 |
| image height | 0 or 16 | 0–65535 |
| implicit quantization | 0 or 1 | 0 = implicit quantization<br>1 = explicit quantization |
| subsampling | 0 or 1 | 0 = 4:4:4 subsampling.<br>1 = 4:2:0 subsampling |
| number of layers | 0 or 6 | 0–63 |
| color precision | 0 or 2 | 0 = 24 bits color<br>1 = 16 bits color<br>2 = 8 bits color<br>3 = 8 bits gray scale |
| transform used | 0 or 2 | 0 = ICT color transform and 9-7 floating point wavelet transform<br>1 = RCT color transform and 5-3 integer wavelet transform |
| number of decomposition levels | 0 or 4 | 0–15 |
| selective arithmetic coding bypass | 0 or 1 | 0 = no selective arithmetic coding bypass<br>1 = selective arithmetic coding bypass |
| vertical stripe causal context | 0 or 1 | 0 = no vertical stripe causal context<br>1 = vertical stripe causal context |

TABLE 5-continued

Example Header Syntax for Case 8

| Parameters | Size (# bits) | Value |
|---|---|---|
| Code-block width | 0 or 3 | 0 = 4<br>1 = 8<br>2 = 16<br>3 = 32<br>4 = 64<br>5–7: reserved |
| Code-block height | 0 or 3 | 0 = 4<br>1 = 8<br>2 = 16<br>3 = 32<br>4 = 64<br>5–7: reserved |
| for (i = 0; i < num_components; i++){ | | num_components = 1 for gray scale images, and 3 for color images |
| for (i = 0; j < num_quan_values; j++) | | num_quan_values = 1 for implicit quantization mode, and 3*number_decomposition_levels + 1 for explicit quantization mode. |
| quantization value | 8 or 16 | 0–255 (8 bits for integer 5-3 wavelet transform)<br>0–65535 (16 bits for floating-point 9-7 wavelet transform) |

Case 9

Header parameters of frames 1 through n do not conform to any of the above cases. In this case, the full header may be transmitted.

SUMMARY

The following table summarizes the above 9 cases.

TABLE 6

Summary of the Header Compression

| | | Data channel | Control channel |
|---|---|---|---|
| Frame | Header parameters | Header | Parameters |
| 1 | Same as default | 1 byte marker 0x00 (hex) | No |
| 1 | Some are different from the default | 1 byte marker 0x00 (hex) | Yes; non-defaults parameters |
| 2 . . . n | Same as those of the previous frame | 1 byte marker 0x00 (hex) | No |
| 2 . . . n | The following cases: | 1 byte marker and the followings, if applicable. Each bit of the maker indicates the presence of some image parameters | |
| 2 . . . n | Width or height is different from the previous frame | additional 4 bytes | No |
| 2 . . . n | implicit quantization mode, subsampling factors, or number of layers is different from the previous frame | additional 1 byte | No |
| 2 . . . n | color precision, color transform used, wavelet transform used, or number of decomposition levels is different from the previous frame | additional 1 byte | No |
| 2 . . . n | selective arithmetic coding bypass, vertically stripe causal context, code-block width or code-block height is different from the previous frame | additional 1 byte | No |

TABLE 6-continued

Summary of the Header Compression

| Cases | | Data channel | Control channel |
|---|---|---|---|
| Frame | Header parameters | Header | Parameters |
| 2 ... n | Quantization values are different from the previous frame | additional n bytes. n = number_components (implicit quantization mode), or n = number_components * (3*number_decomposition_levels + 1) (explicit quantization mode) | No |
| | None of the above | Full header | No |

Figure 1B:
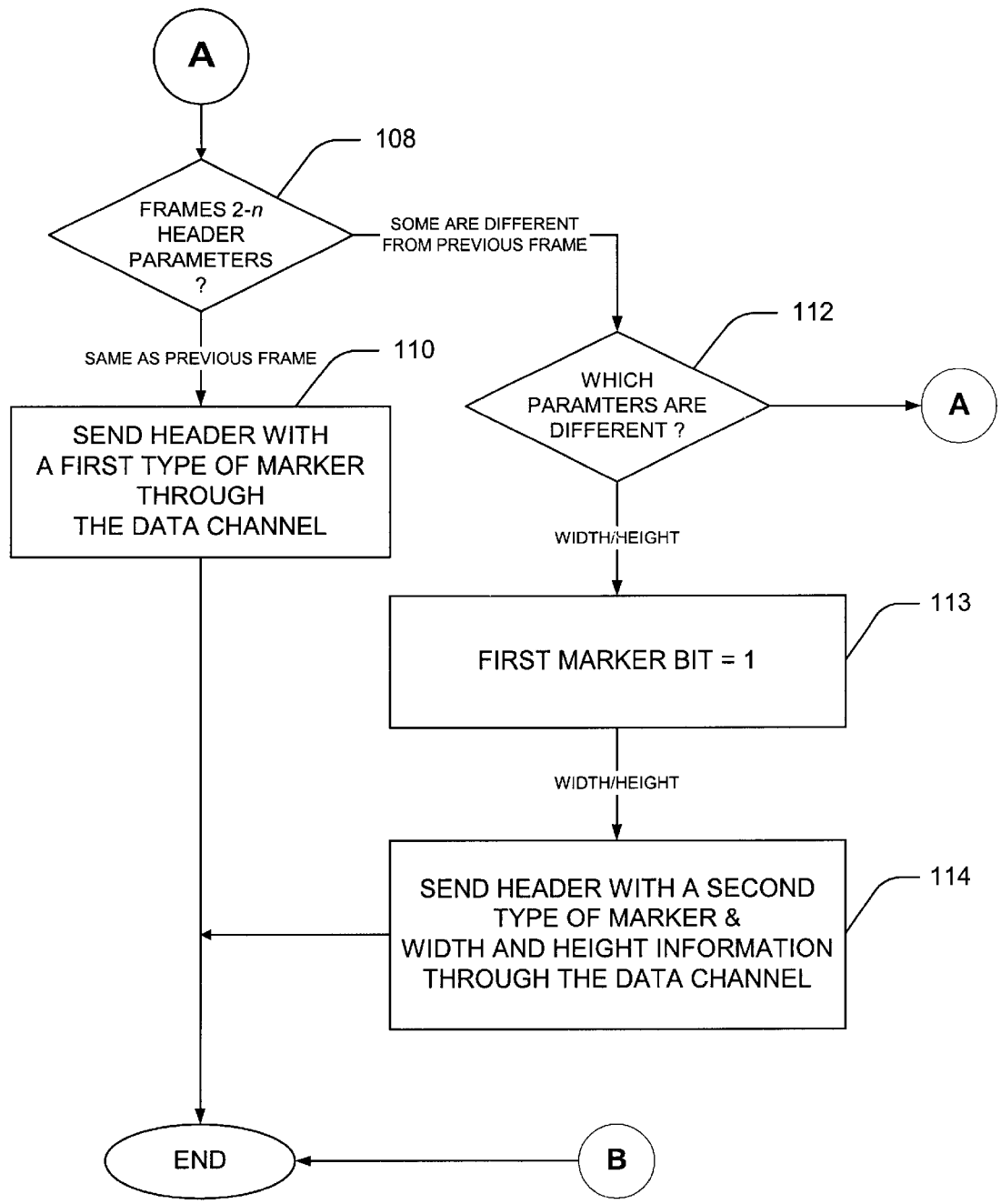
Figure 1C:
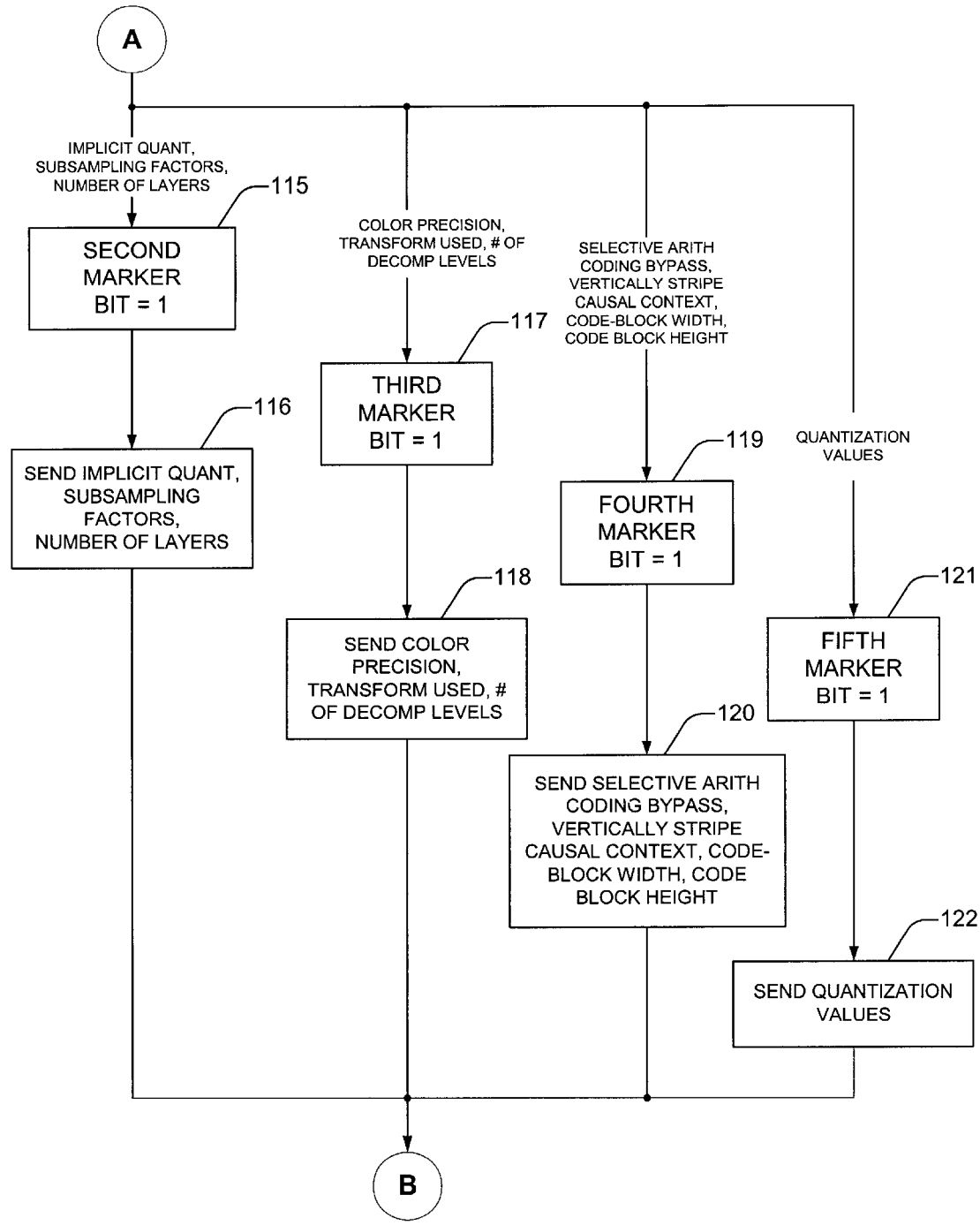

A flowchart of the header compression method in accordance with an embodiment of the present invention is shown in FIGS. 1A and 1B. In the illustrated embodiment of FIG. 1A, the header compression method includes determining the current frame at 100. If the current frame is frame 1, the header of frame 1 is examined at 102. If frame 1 header parameters are same as default parameters, then the frame 1 header is compressed to include only a first type of marker, at 104. In one embodiment, the marker is a one-byte marker of 0x00 (hex). The compressed header may then be sent through the data channel. Otherwise if frame 1 header parameters include some parameters that are different from default parameters, then the frame 1 header is compressed to include only a first type of marker, at 104. Again, in one embodiment, the first type of marker is a one-byte marker of 0x00 (hex). The compressed header may then be sent through the data channel. Furthermore, the parameters that are different from the default parameters may be sent through the control channel, at 106. In one embodiment, the control channel is a Real-time Streaming Protocol (RTSP).

In the illustrated embodiment of FIG. 1B, the headers of frames 2 through n are examined at 108. If the header parameters of frames 2 through n are same as those of the previous frame, then the frame header is compressed to include only a first type of marker, at 110. The compressed header may then be sent through the data channel.

Otherwise if some header parameters of frames 2 through n are different from those of the previous frame, then the different parameters are determined at 112. Thus, for example, if the header parameters, width or height, is different, the first (least significant) bit of the marker is set to 1, at 113. Furthermore, the compressed frame header may also include width and height information (at 114), each of which occupies 2 bytes. The compressed header may then be sent through the data channel.

If the header parameters, implicit quantization, subsampling factors, or number of layers, is different, the second bit of the marker is set to 1, at 115. Furthermore, the compressed frame header may also include implicit quantization, subsampling, and/or number of layers, at 116. In the illustrated embodiment, the implicit quantization occupies 1 bit, the subsampling factors 1 bit, and the number of layers 6 bits, for a total of 8 bits, or 1 byte. The compressed header may then be sent through the data channel.

If the header parameters, color precision, transform used, or number of decomposition levels, is different, the third bit of the marker is set to 1, at 117. Furthermore, the compressed frame header may also include color precision, transform used, and/or number of decomposition levels, at 118. In the illustrated embodiment, the color precision occupies 2 bits, the transform used 2 bits, and the number of decomposition levels 4 bits, for a total of 8 bits, or 1 byte. The compressed header may then be sent through the data channel.

If the header parameters, selective arithmetic coding bypass, vertically stripe causal context, code-block width, or code-block height, is different, the fourth bit of the marker is set to 1, at 119. Furthermore, the compressed frame header may also include arithmetic coding bypass, vertically stripe causal context, code-block width, and/or code-block height information, at 120. In this embodiment, the arithmetic coding bypass occupies 1 bit, the vertically stripe causal context 1 bit, the code-block width 3 bits and the code-block height 3 bits, for a total of 8 bits, or 1 byte. The compressed header may then be sent through the data channel.

If the header parameter, quantization values (step sizes), is different, the fifth bit of the marker is set to 1, at 121. Furthermore, the compressed frame header may also include quantization values, at 122. In this embodiment, each quantization value occupies either 8 bits (5-3 wavelet transform) or 16 bits (9-7 wavelet transform), for a total of $c*(3*L+1)$ quantization values. In this case, c is the number of components and L is the number of decomposition levels. Note that L equals 0 in the case of implicit quantization. The compressed header may then be sent through the data channel.

Figure 2:
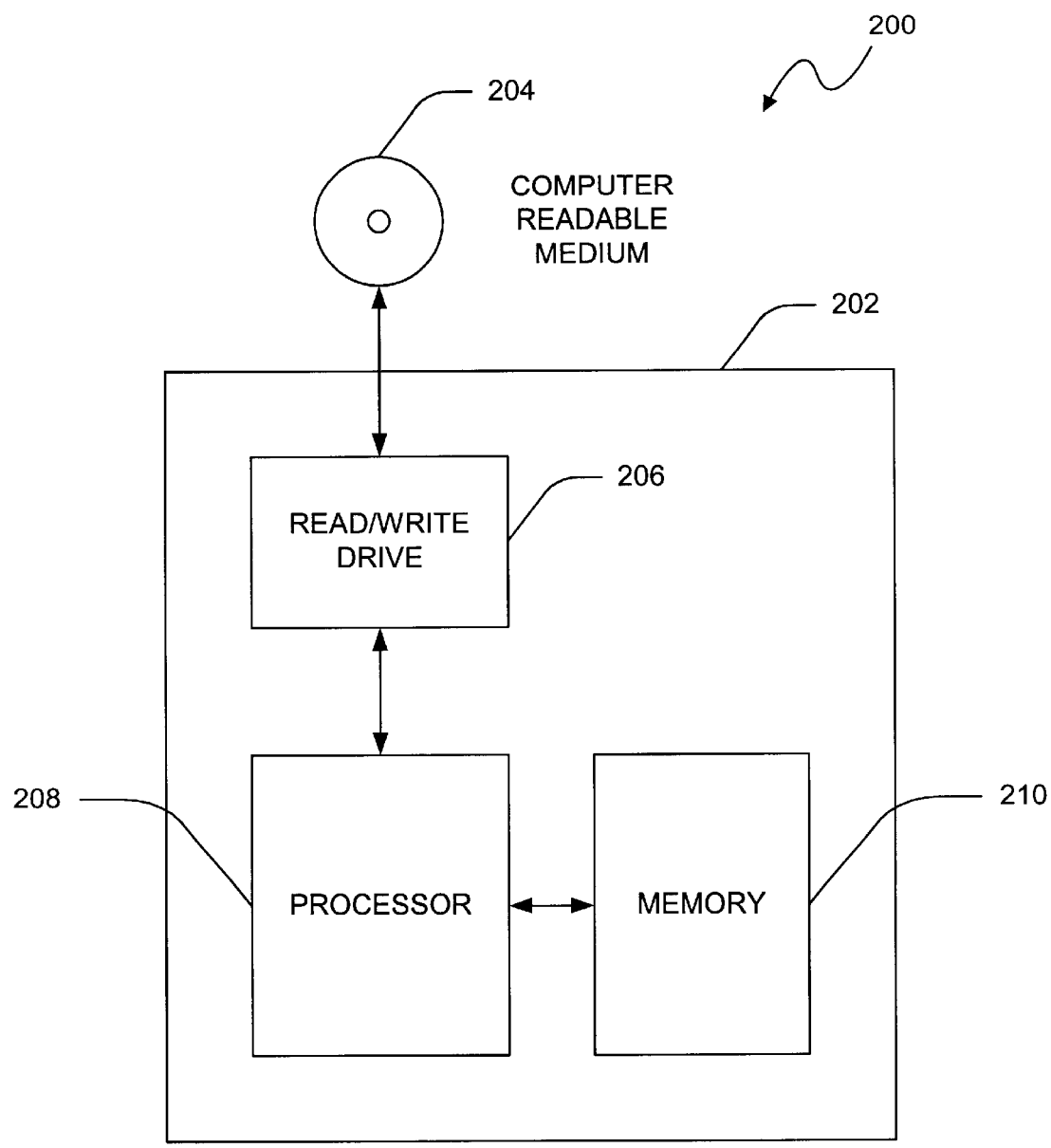
FIG. 2 is a block diagram of a header compression system according to an embodiment of the present invention.

FIG. 2 is a block diagram of a header compression system 200, which includes a processing system 202 and a computer readable medium 204. The computer readable medium 204 includes executable instructions. The instructions form a computer program arranged to execute the header compression method described above. The instructions may be executed in the processing system 202. The processing system 202 also includes a read/write drive 206 that reads instructions on the computer readable medium 204, a processor 208 that executes the instructions, and a memory 210.

There has been disclosed herein embodiments for header compression of image data stream. In one embodiment, frame 1 header parameters are compressed by comparing the parameters with the default parameters. The header is compressed to include only a first type of marker. The compressed header is then transmitted through the data channel. If frame 1 header parameters include some parameters that are different from the default parameters, then the non-default parameters are sent through the control channel. In another embodiment, frames 2 through n are compared to the previous frame. If the parameters in frames 2 through n are same as those of the previous frame, then the header is compressed to include only a first type of marker. Otherwise if any of the parameters in frames 2 through n are different from those of the previous frame, then the header may include a marker plus information about those different parameters.

While specific embodiments of the invention have been illustrated and described, such descriptions have been for purposes of illustration only and not by way of limitation. Accordingly, throughout this detailed description, for the purposes of explanation, numerous specific details were set forth in order to provide a thorough understanding of the present invention. It will be apparent, however, to one skilled in the art that the system and method may be practiced without some of these specific details. For example, the header parameters width, height, color precision, and/or quantization were given for illustrative purposes only. Other header parameters, including information about image and tiles such as tile size, number of components, component transforms used, wavelet transform used, component precision, subsampling factors, number of decomposition levels, number of layers, code-block size, quantization, coding styles, and other related parameters, or combinations of these parameters, may be used in the header compression. In other instances, well-known structures and functions were not described in elaborate detail in order to avoid obscuring the subject matter of the present invention. Accordingly, the scope and spirit of the invention should be judged in terms of the claims which follow.

What is claimed is:

1. A method for compressing headers of image frames, comprising:
   receiving a header of a first frame, said header including a plurality of header parameters;
   determining whether there are differences between the header parameters and a plurality of default parameters;
   first sending non-default parameters when there are differences;
   compressing said header to include only a first type of marker; and
   second sending said compressed header.

2. The method of claim 1, wherein said image frames include frames coded in JPEG2000.

3. The method of claim 2, wherein the plurality of header parameters includes information about image and tiles, including image size (width and height), tile size, number of components, component transforms used, wavelet transform used, component precision, number of decomposition levels, color/depth, number of layers, code-block size, quantization, coding styles (e.g. selective arithmetic coding bypass and/or vertically stripe causal context) or some combinations of these parameters.

4. The method of claim 1, further comprising:
   designating the differences in the header parameters as non-default parameters.

5. The method of claim 1, wherein said first sending non-default parameters uses a control channel.

6. The method of claim 5, wherein said control channel includes a Real-time Streaming Protocol (RTSP).

7. The method of claim 1, wherein said second sending said compressed header uses a data channel.

8. The method of claim 7, wherein said data channel includes a User Datagram Protocol (UDP).

9. The method of claim 1, wherein said first type of marker includes a one-byte marker.

10. The method of claim 9, wherein the one-byte marker has a hex value 0x00.

11. The method of claim 1, further comprising:
    receiving a second header of a frame subsequent to the first frame, said second header including a second plurality of header parameters;
    determining whether there are differences between the second plurality of header parameters and a previous plurality of header parameters;
    first compressing said second header to include only a first type of marker when there are no differences;
    second compressing said second header to include a second type of marker, and a group of parameters that are different, when there are differences; and
    sending said compressed second header.

12. A method for compressing headers of image frames, comprising:
    receiving a header of a current frame subsequent to a first frame, said header including a plurality of header parameters;
    determining whether there are differences between the plurality of header parameters and a previous plurality of header parameters;
    first compressing said header to include only a first type of marker when there are no differences;
    second compressing said header to include a second type of marker, and a group of parameters that are different, when there are differences; and
    sending said compressed header.

13. The method of claim 12, wherein the group of parameters includes parameters having information about image and tiles, including image size (width and height), tile size, number of components, component transforms used, wavelet transform used, component precision, subsampling factor, number of decomposition levels, color/depth, number of layers, code-block size, coding styles (e.g. selective arithmetic coding bypass and vertically stripe causal context), quantization, or some combinations of these parameters.

14. The method of claim 12, wherein said second type of marker includes a one-byte non-zero marker.

15. The method of claim 14, wherein each bit of the first and second type of marker indicates a presence of certain image parameters.

16. The method of claim 14, wherein size of said compressed header is derived from the first and second type of marker.

17. The method of claim 12, wherein said sending said compressed header uses a data channel.

18. The method of claim 12, wherein said previous plurality of header parameters includes header parameters from frames prior to the current frame.

19. A computer readable medium containing executable instructions which, when executed in a processing system, causes the system to perform header compression, comprising:
    receiving a header of a first frame, said header including a plurality of header parameters;
    determining whether there are differences between the header parameters and a plurality of default parameters;
    first sending non-default parameters when there are differences;
    compressing said header to include only a first type of marker; and
    second sending said compressed header.

20. The computer readable medium of claim 19, further comprising:
    receiving a second header of a frame subsequent to the first frame, said second header including a second plurality of header parameters;
    determining whether there are differences between the second plurality of header parameters and a previous plurality of header parameters;

first compressing said second header to include only a first type of marker when there are no differences;

second compressing said second header to include a second type of marker, and a group of parameters that are different when there are differences; and sending said compressed second header.

21. A computer readable medium containing executable instructions which, when executed in a processing system, causes the system to perform header compression, comprising:

receiving a header of a current frame subsequent to a first frame, said header including a plurality of header parameters;

determining whether there are differences between the plurality of header parameters and a previous plurality of header parameters;

first compressing said header to include only a first type of marker when there are no differences;

second compressing said header to include a second type of marker, and a group of parameters that are different when there are differences; and sending said compressed header.

22. The computer readable medium of claim 21, wherein said previous plurality of header parameters includes header parameters from frames prior to the current frame.

* * * * *